(12) United States Patent
Kulkarni et al.

(10) Patent No.: US 11,250,452 B2
(45) Date of Patent: Feb. 15, 2022

(54) METHOD AND SYSTEM FOR SMART ADDRESS CLASSIFICATION

(71) Applicant: NTEX Transportation Services Pvt. Ltd., Pune (IN)

(72) Inventors: Yogesh Kulkarni, Pune (IN); Rohit Gupta, Pune (IN); Tanay Shah, Pune (IN); Shitiz Bansal, Pune (IN)

(73) Assignee: NTEX Transportation Services Pvt. Ltd., Maharashtra (IN)

( * ) Notice: Subject to any disclaimer, the term of this patent is extended or adjusted under 35 U.S.C. 154(b) by 61 days.

(21) Appl. No.: 16/222,950

(22) Filed: Dec. 17, 2018

(65) Prior Publication Data
US 2020/0058042 A1 Feb. 20, 2020

(51) Int. Cl.
G06Q 30/02 (2012.01)
(52) U.S. Cl.
CPC .................. *G06Q 30/0205* (2013.01)
(58) Field of Classification Search
USPC ........................................ 705/7.34, 313, 315
See application file for complete search history.

(56) References Cited

U.S. PATENT DOCUMENTS

| | | | | |
|---|---|---|---|---|
| 9,829,333 | B1* | 11/2017 | Calder | G08G 1/166 |
| 2008/0312942 | A1* | 12/2008 | Katta | G06Q 10/04 |
| | | | | 705/7.34 |
| 2009/0300528 | A1* | 12/2009 | Stambaugh | G06F 16/9537 |
| | | | | 715/764 |
| 2012/0283948 | A1* | 11/2012 | Demiryurek | G01C 21/3492 |
| | | | | 701/533 |
| 2012/0295639 | A1* | 11/2012 | Fitoussi | H04W 4/021 |
| | | | | 455/456.3 |
| 2013/0016106 | A1* | 1/2013 | Yip | G06T 11/206 |
| | | | | 345/440 |
| 2013/0067114 | A1* | 3/2013 | Hjelm | G06Q 30/0282 |
| | | | | 709/243 |

(Continued)

FOREIGN PATENT DOCUMENTS

IN 201821031121 * 8/2018

OTHER PUBLICATIONS

A star algorithm, Wikipedia webpages, archives org Nov. 12, 2018 https://web.archive.org/web/20181112015545/https://en.wikipedia.org/wiki/A*_search_algorithm (Year: 2018).*

(Continued)

*Primary Examiner* — Octavian Rotaru
(74) *Attorney, Agent, or Firm* — Kolisch Hartwell, P.C.

(57) ABSTRACT

The present disclosure provides computer-implemented method and a system for classification and sorting of one or more addresses to increase productivity of classification and sorting process of the one or more addresses. The system logically partitions a geographical region into one or more zones in real-time. The system fetches an address data from an entity of the one or more entities containing destination address. Further, the system extracts one or more points of interests from the fetched address data based on hardware-run machine learning algorithms. Furthermore, the system generates a signal to determine a zone of the one or more zones associated with the entity of the one or more entities. The system logically updates the one or more zones based on the extracted one or more points of interests in real-time.

4 Claims, 4 Drawing Sheets

(56) References Cited

U.S. PATENT DOCUMENTS

| | | | | |
|---|---|---|---|---|
| 2014/0122238 A1* | 5/2014 | Lewis | .................... | G06Q 30/02 |
| | | | | 705/14.58 |
| 2015/0081212 A1* | 3/2015 | Mitchell | .............. | G01C 21/367 |
| | | | | 701/454 |
| 2017/0109947 A1* | 4/2017 | Prokhorov | ........... | G07C 5/0841 |
| 2017/0132675 A1* | 5/2017 | Myers | ................ | G06Q 30/0282 |

OTHER PUBLICATIONS

NTEX Ltd youtube channel, Feb. 1-Jul. 19, 2017 https://www.youtube.com/channel/UCw5sNKPmHBQswWZCeFnVa9w (Year: 2017).*

* cited by examiner

METHOD AND SYSTEM FOR SMART ADDRESS CLASSIFICATION

TECHNICAL FIELD

The present invention relates to a field of logistics, and in particular, relates to a method and system for providing a process for classification and sorting of addresses.

INTRODUCTION

Various businesses and industry (Logistics, for example) provides management of flow of entities between point of origin and point of consumption. The businesses provide such management in order to meet requirements of customers or corporations. The resources managed in such businesses may include items such as food, materials, animals, equipment, liquids, information and the like. The resources, also termed as entities are processed or assigned or transferred or shipped from one location to another location via a process known as shipping or movement. The main challenge in businesses is to determine accurate location of a facility from delivery address on the entity provided by a user. The accurate location of the facility is determined to predict shortest route to move or handle the entity from present location to location of delivery address of the entity. The determination of the shortest route for movement or handling of the entity saves money, time and effort of each and every person involved in movement or handling of the entity including classification, sorting and assignment for next level handling.

Currently, the classification or sectorization and routing path of the entity is determined based on postal code available in delivery address on the entity. However, determination of the routing path based on the postal code available in delivery address of the entity has various limitations. The classification or sectorization and routing path of the entity is determined manually by individuals working in the business. This, in turn increases dependency on skilled individuals working in the business for determination of the right class or zone and shortest routing path. Further, the entities are inefficiently classified and sorted to move through different routing paths to determine shortest routing path when the entities are classified and sorted based on the postal code wise classification and sorting at business premise or location. The postal code wise classification and sorting process of the entities consumes a lot of processing time during movement and handling process of the entities. As a result, the entities are processed, handled and delivered in an unsystematic manner. This, in turn consumes up a lot of time, effort, and manpower. In light of the above stated discussion, there is a constant need to increase productivity of address classification and sorting process of the entities and reduce processing time of business process of the entity.

SUMMARY

In a first example, a computer implemented method is provided. The computer-implemented method may be configured to classify and sort one or more addresses to increase productivity of classification and sorting process of the one or more addresses. The computer-implemented method includes a first step of logically partitioning a geographical region into one or more logical zones in real-time. The computer-implemented method includes another step of fetching an address data from an entity of the one or more entities containing destination address. The computer-implemented method includes yet another step of extracting one or more points of interests from the fetched address data based on hardware-run machine learning algorithms. The computer-implemented method includes yet another step of generating a signal by the signal generator circuitry embedded inside the computing device hosting the address classification and sorting system. The computer-implemented method includes yet another step of logically updating the one or more logical zones based on the extracted one or more points of interests in real-time. The one or more logical zones are one or more sub-regions of the geographical region. The logical partitioning of the geographical region is done based on one or more pre-defined points of interests. The logical partitioning of the geographical region is done based on one or more parameters. The one or more parameters include population density, number of addresses, business interests from the addresses and nearby connectivity. The address data is fetched from the entity of the one or more entities using one or more input devices. The address data is fetched from the entity of the one or more entities using hardware-run text-processing algorithms in real-time. The one or more points of interests are extracted from the address data based on one or more steps. The extraction is done to determine a particular zone of the one or more logical zones associated with the address of the one or more entities. The signal is generated for determining the zone of the one or more logical zones associated with the entity of the one or more entities. The determination is done based on mapping of the one or more pre-defined points of interests with the extracted one or more points of interests. The determination is done to sort the entity of the one or more entities into the associated zone of the one or more logical zones. The sector of the one or more sectors is determined based on a confidence level. The confidence level is calculated based on the one or more parameters in real-time. The confidence level enables prediction of unforeseen address data with higher level of accuracy. The updating is done for the newly fetched address data. The updating is done in dynamic and adaptive nature. The updating is done based on the one or more parameters. The updating is done to speed up processing and reducing dependency on resources during the sorting process of the one or more entities.

In an embodiment of the present disclosure, the geographical region is physical area that comprises the one or more facility. The geographical region is logically partitioned into the one or more logical zones by the address classification and sorting system. The one or more logical zones are virtual zones that are created and updated in dynamic and adaptive nature in real-time.

In an embodiment of the present disclosure, the one or more logical zones dynamically adapts to one or more geometrical shapes and sizes based on the one or more parameters.

In an embodiment of the present disclosure, the one or more pre-defined points of interests are segmented into one or more pre-defined localities and sub-localities. The segmentation is done to train the address classification and sorting system to recognize and extract the new points of interests from the address data.

In an embodiment of the present disclosure, the address data includes one or more unstructured address information associated with one or more facilities. Form of the address data is at least one of human or machine readable forms. The human or machine readable forms include text, audio, video, image, gif, animation, electronic form and hand-written form.

In an embodiment of the present disclosure, the address data is fetched using the one or more input devices. The one or more input devices include at least one of keyboard, scanner, pointing device, optical character reader, bar code reader, camera, microphone and tablet.

In an embodiment of the present disclosure, the hardware-run text processing algorithms include optical character recognition algorithms and natural language processing algorithms. The hardware-run machine learning algorithms include graph-based machine learning algorithms, prediction algorithms and phonetic distance based fuzzy search algorithms. The hardware-run machine learning algorithms facilitate training of the address classification and sorting system. The training is done based on previously extracted and segmented unstructured address data.

In an embodiment of the present disclosure, the one or more points of interests are segmented into one or more localities and sub-localities. The segmentation is done based on the one or more steps. The one or more steps include address cleaning, spell-check, spell-suggest, address tagging, and micro-classification.

In an embodiment of the present disclosure, the confidence level is updated for each zone of the one or more logical zones in real-time. The updating of the confidence level is dynamic and adaptive in nature.

In a second example, the present disclosure provides a computer system. The computer system includes one or more processors, a signal generator circuitry embedded inside a computing device for generating a signal, and a memory. The memory is coupled to the one or more processors. The memory stores instructions. The instructions are executed by the one or more processors. The execution of instructions causes the one or more processors to perform a method to classify and sort one or more addresses to increase productivity of classification and sorting process of the one or more addresses. The computer-implemented method includes a first step of logically partitioning a geographical region into one or more logical zones in real-time. The computer-implemented method includes another step of fetching an address data from an entity of the one or more entities containing destination address. The computer-implemented method includes yet another step of extracting one or more points of interests from the fetched address data based on hardware-run machine learning algorithms. The computer-implemented method includes yet another step of generating a signal by the signal generator circuitry embedded inside the computing device hosting the address classification and sorting system. The computer-implemented method includes yet another step of logically updating the one or more logical zones based on the extracted one or more points of interests in real-time. The one or more logical zones are one or more sub-regions of the geographical region. The logical partitioning of the geographical region is done based on one or more pre-defined points of interests. The logical partitioning of the geographical region is done based on one or more parameters. The one or more parameters include population density, number of addresses, business interests from the addresses and nearby connectivity. The address data is fetched from the entity of the one or more entities using one or more input devices. The address data is fetched from the entity of the one or more entities using hardware-run text-processing algorithms in real-time. The one or more points of interests are extracted from the address data based on one or more steps. The extraction is done to determine a particular zone of the one or more logical zones associated with the address of the one or more entities. The signal is generated for determining the zone of the one or more logical zones associated with the entity of the one or more entities. The determination is done based on mapping of the one or more pre-defined points of interests with the extracted one or more points of interests. The determination is done to sort the entity of the one or more entities into the associated zone of the one or more logical zones. The sector of the one or more sectors is determined based on a confidence level. The confidence level is calculated based on the one or more parameters in real-time. The confidence level enables prediction of unforeseen address data with higher level of accuracy. The updating is done for the newly fetched address data. The updating is done in dynamic and adaptive nature. The updating is done based on the one or more parameters. The updating is done to speed up processing and reducing dependency on resources during the sorting process of the one or more entities.

In a third example, a non-transitory computer readable medium is provided. The non-transitory computer readable medium having instructions stored which are executed by one or more processors to perform a method to classify and sort one or more addresses to increase productivity of classification and sorting process of the one or more addresses. The computer-implemented method includes a first step of logically partitioning a geographical region into one or more logical zones in real-time. The computer-implemented method includes another step of fetching an address data from an entity of the one or more entities containing destination address. The computer-implemented method includes yet another step of extracting one or more points of interests from the fetched address data based on hardware-run machine learning algorithms. The computer-implemented method includes yet another step of generating a signal by the signal generator circuitry embedded inside the computing device hosting the address classification and sorting system. The computer-implemented method includes yet another step of logically updating the one or more logical zones based on the extracted one or more points of interests in real-time. The one or more logical zones are one or more sub-regions of the geographical region. The logical partitioning of the geographical region is done based on one or more pre-defined points of interests. The logical partitioning of the geographical region is done based on one or more parameters. The one or more parameters include population density, number of addresses, business interests from the addresses and nearby connectivity. The address data is fetched from the entity of the one or more entities using one or more input devices. The address data is fetched from the entity of the one or more entities using hardware-run text-processing algorithms in real-time. The one or more points of interests are extracted from the address data based on one or more steps. The extraction is done to determine a particular zone of the one or more logical zones associated with the address of the one or more entities. The signal is generated for determining the zone of the one or more logical zones associated with the entity of the one or more entities. The determination is done based on mapping of the one or more pre-defined points of interests with the extracted one or more points of interests. The determination is done to sort the entity of the one or more entities into the associated zone of the one or more logical zones. The sector of the one or more sectors is determined based on a confidence level. The confidence level is calculated based on the one or more parameters in real-time. The confidence level enables prediction of unforeseen address data with higher level of accuracy. The updating is done for the newly fetched address data. The updating is done in dynamic and adaptive nature.

The updating is done based on the one or more parameters. The updating is done to speed up processing and reducing dependency on resources during the sorting process of the one or more entities.

BRIEF DESCRIPTION OF THE FIGURES

Figure 1:
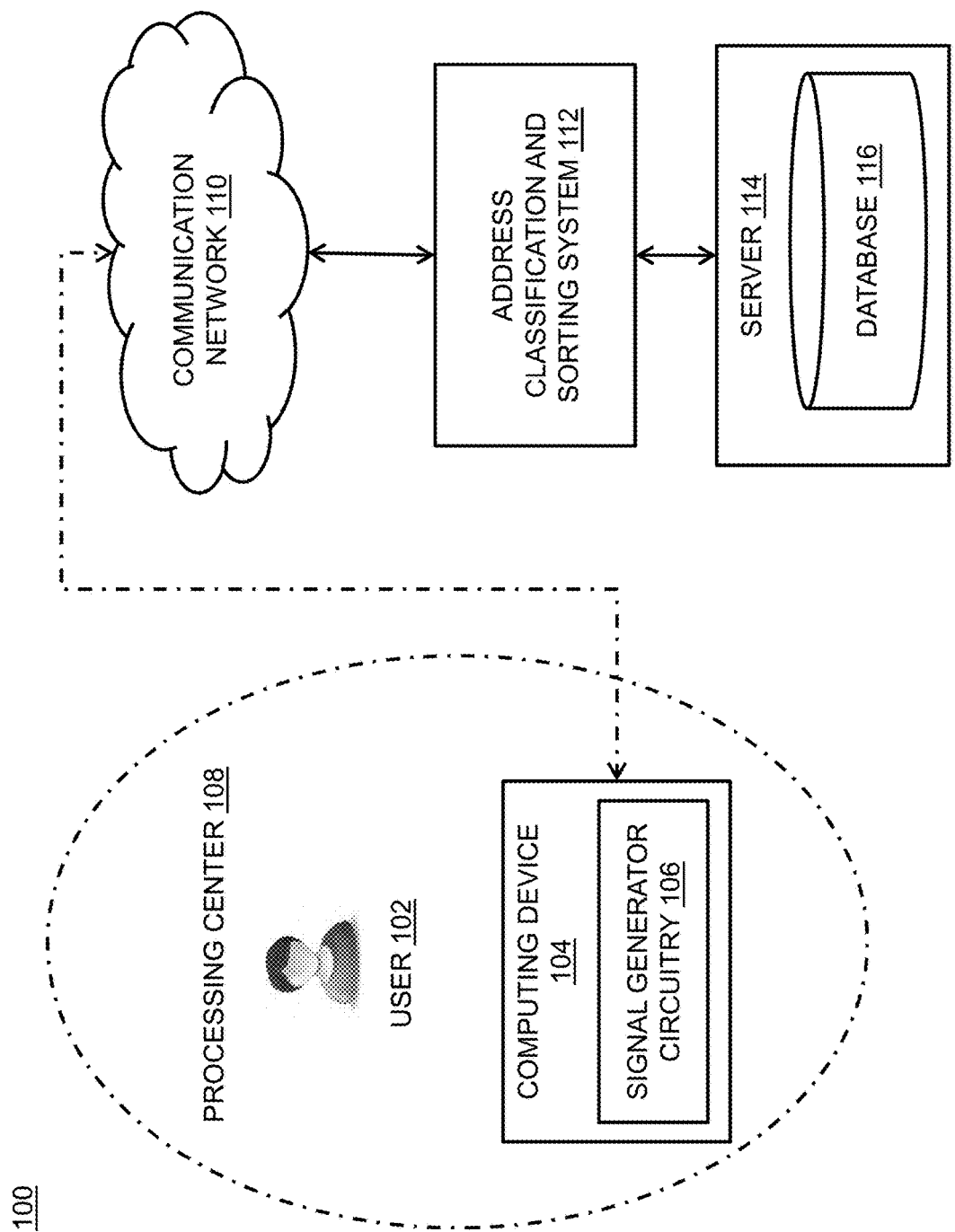
Figure 2:
Figure 3:
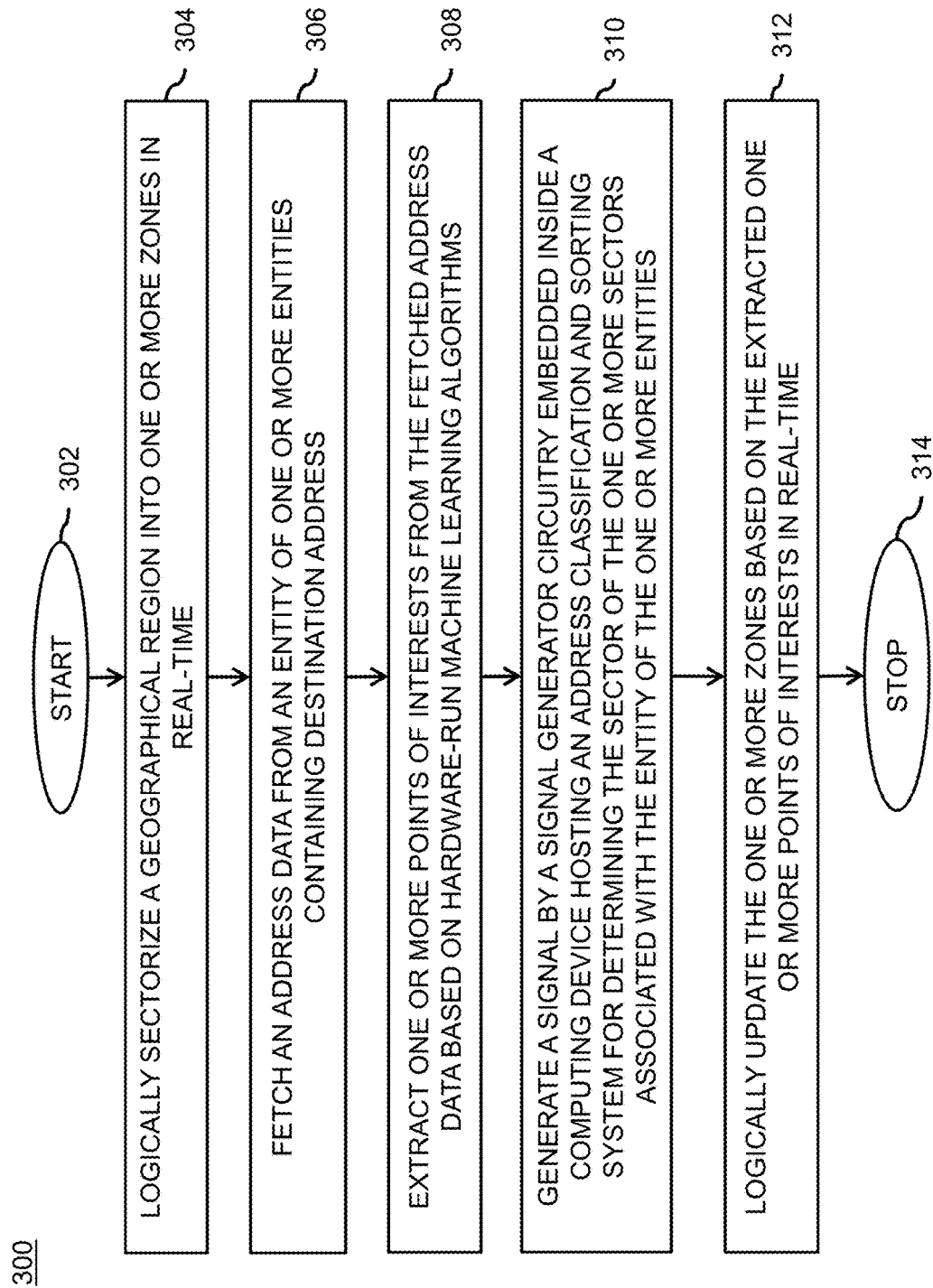
Figure 4:
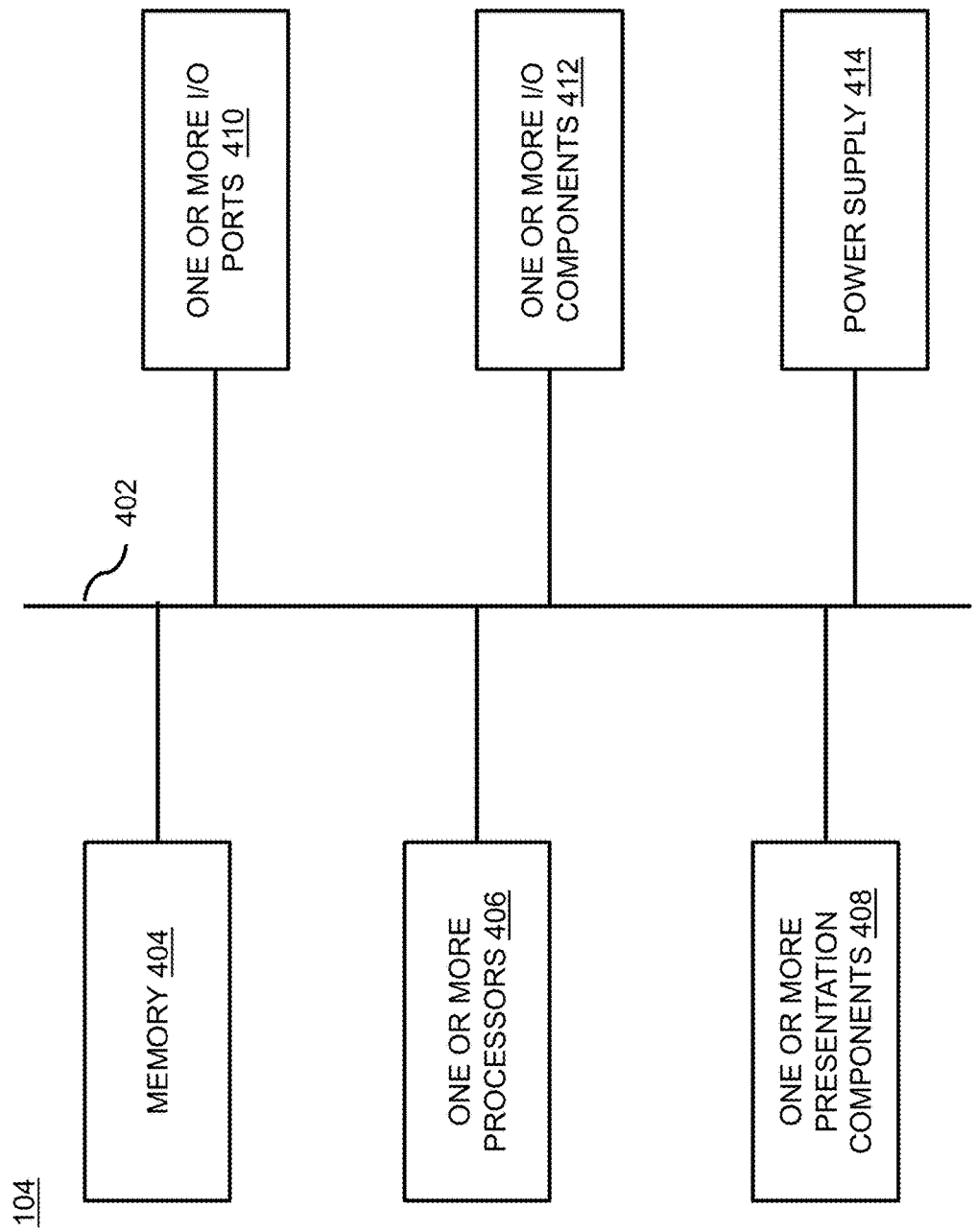

Having thus described the invention in general terms, reference will now be made to the accompanying drawings, which are not necessarily drawn to scale, and wherein:

FIG. 1 illustrates an interactive computing environment for sorting of one or more entities based on their address, in accordance with various embodiments of the present disclosure;

FIG. 2 illustrates an example of logically partitioning a geographical region into one or more logical zones in real-time, in accordance with various embodiments of the present disclosure;

FIG. 3 illustrates a flowchart of a method for sorting of the one or more entities based on their address, in accordance with various embodiments of the present disclosure; and FIG. 4 illustrates a block diagram of a computing device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

In the following description, for purposes of explanation, numerous specific details are set forth in order to provide a thorough understanding of the present technology. It will be apparent, however, to one skilled in the art that the present technology can be practiced without these specific details. In other instances, structures and devices are shown in block diagram form only in order to avoid obscuring the present technology.

Reference in this specification to "one embodiment" or "an embodiment" means that a particular feature, structure, or characteristic described in connection with the embodiment is included in at least one embodiment of the present technology. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1 illustrates a general overview of an interactive computing environment 100 for sorting and classifying of one or more entities, in accordance with various embodiments of the present disclosure. The interactive computing environment 100 includes a user 102, a computing device 104, a signal generator circuitry 106, a processing center 108, a communication network 110, an address classification and sorting system 112, a server 114, and a database 116. The interactive computing environment 100 includes the user 102. The user 102 is any person who wants to sort the one or more entities for easier planning and classification of the one or more entities. The one or more entities are sorted for efficient processing during routing, movement and assignment of the one or more entities. The user 102 is the person who wants to determine location of one or more facilities where the one or more entities are intended to be processed. In general, the entity includes but may not be limited to a load of goods or information or commodities or vehicles. Further, the entity may be sent to a person, people, an office, a premises and the like. In an example, the entity includes goods such as mail, mobile phone, laptop, clothing, shoes, accessories and the like. In general, facility refers to a place, especially buildings, where a particular activity happens. The term facility here refers to any place, building, organization, institute, skyscraper and the like. Further, the term facility may include restaurants, coffee shops, medical institutions, schools, colleges, theatres, apartments, buildings, houses, hotels, offices and the like.

The entity is associated with one or more addresses. The one or more addresses include but may not be limited to an origin address and a destination address. In an embodiment of the present disclosure, the origin address and the destination address may be present on the entity on a label, tag and the like. In another embodiment of the present disclosure, the origin address and the destination address is associated with the entity in memory, the database and the like. In general, the origin address represents the address of the origin for the entity. The destination address represents the address where the entity is intended to be delivered. In general, the address is a collection of information presented in a fixed format. The address is used to give exact location of a facility, building, apartment, a plot and other structure. In general, the location is provided using political boundaries and street names as references along with other identifiers such as house number, apartment numbers, blocks and the like. The address includes the house number, name of the road, name of the town where a person lives or work, street name and the like. In an example, the receiver address is accurate and exact location where the facility is situated and where the entity is intended to be delivered.

The processing center 108 provides storage space for the one or more entities. In an embodiment of the present disclosure, the user 102 is present inside the processing center 108. In general, the processing center 108 is a commercial building used for storage of goods. The processing center is used by manufacturers, importers, exporters, wholesalers, transport businesses, customs, and the like. The user 102 is required to have knowledge of accurate location of destination address of the entity to sort the one or more entities into one or more classes or sectors or compartments (hereinafter "compartments"). The one or more compartments are compartments made at the processing center 108 to store the one or more entities after sorting of the one or more entities based on its address. The one or more compartments are made based on one or more logical zones. In an embodiment of the present disclosure, the one or more compartments are made based on shortest route to delivery location. The one or more entities are sorted so that they may travel shortest route to reach at location of the delivery address of the one or more entities. In an embodiment of the present disclosure, the user 102 is any company or seller that wants to reduce processing time of delivery process of the one or more entities. In an embodiment of the present disclosure, the user 102 may be unaware of exact location of the delivery address of the one or more entities. In an embodiment of the present disclosure, the user 102 is a person that uses a system or software product without technical expertise required to fully understand it.

In an embodiment of the present disclosure, the user 102 is the person who wants to increase productivity during sorting process of the one or more entities into the one or more compartments. In an example, the one or more entities are intended to be delivered at different locations. The user 102 sorts the one or more entities into the one or more compartments for faster processing during delivery or handling or processing of the one or more entities. The user 102 has to recognize accurate location of the delivery address of the one or more entities to determine the one or more compartments to store the one or more entities after the sorting process. In an example, the user 102 stores the entities into a compartment dedicated for storing entities that are intended to be delivered to or processed for one or more addresses falling under a logical zone one. In another example, the user 102 stores the entities into a compartment dedicated for storing entities that are intended to be delivered to or processed for one or more addresses falling under a logical zone five.

The user 102 is associated with the computing device 104. The computing device 104 is any smart device that mainly comprises a display, camera and network connectivity. In an embodiment of the present disclosure, the computing device 104 is a portable computing device 104. In an example, the portable computing device includes laptop, smartphone, tablet, PDA and the like. In another embodiment of the present disclosure, the computing device 104 is a fixed computing device. In an example, the fixed computing device includes a desktop, a workstation PC and the like.

The computing device 104 performs computing operations based on a suitable operating system installed inside the computing device 104. In general, the operating system is system software that manages computer hardware and software resources and provides common services for computer programs. In addition, the operating system acts as an interface for software installed inside the computing device 104 to interact with hardware components of the computing device 104. In an embodiment of the present disclosure, the operating system installed inside the computing device 104 is a mobile operating system. In an embodiment of the present disclosure, the computing device 104 performs computing operations based on any suitable operating system designed for portable computing device. In an example, the mobile operating system includes but may not be limited to Windows operating system from Microsoft, Android operating system from Google, iOS operating system from Apple, Symbian based operating system from Nokia, Bada operating system from Samsung Electronics and BlackBerry operating system from BlackBerry. However, the operating system is not limited to above mentioned operating systems. In an embodiment of the present disclosure, the computing device 104 operates on any version of above mentioned operating systems.

In another embodiment of the present disclosure, the computing device 104 performs computing operations based on any suitable operating system designed for fixed computing device. In an example, the operating system installed inside the computing device 104 is Windows from Microsoft. In another example, the operating system installed inside the computing device 104 is Mac from Apple. In yet another example, the operating system installed inside the computing device 104 is Linux based operating system. In yet another example, the operating system installed inside the computing device 104 may be one of UNIX, Kali Linux, and the like. However, the operating system is not limited to above mentioned operating systems.

In an embodiment of the present disclosure, the computing device 104 operates on any version of Windows operating system. In another embodiment of the present disclosure, the computing device 104 operates on any version of Mac operating system. In another embodiment of the present disclosure, the computing device 104 operates on any version of Linux operating system. In yet another embodiment of the present disclosure, the computing device 104 operates on any version of the above mentioned operating systems.

In an embodiment of the present disclosure, the computing device 104 includes an advanced vision display panel. The advanced vision display panel includes OLED, AMO-LED, Super AMOLED, Retina display, Haptic touchscreen display and the like. In another embodiment of the present disclosure, the computing device 104 includes a basic display panel. The basic display panel includes but may not be limited to LCD, IPS-LCD, capacitive touchscreen LCD, resistive touchscreen LCD, TFT-LCD and the like.

The computing device 104 is connected to the communication network 110. The communication network 110 provides medium to the computing device 104 to connect to the address classification and sorting system 112. Also, the communication network 110 provides network connectivity to the computing device 104. In an example, the communication network 110 uses protocol to connect the computing device 104 to the address classification and sorting system 112. The communication network 110 connects the computing device 104 to the address classification and sorting system 112 using a plurality of methods. The plurality of methods used to provide network connectivity to the computing device 104 includes 2G, 3G, 4G, Wifi, BLE, LAN, VPN, WAN and the like.

In an embodiment of the present disclosure, the communication network 110 may be any type of network that provides network connectivity to the computing device 104. In an embodiment of the present disclosure, the communication network 110 is a wireless mobile network. In another embodiment of the present disclosure, the communication network 110 is a wired network with a finite bandwidth. In yet another embodiment of the present disclosure, the communication network 110 is combination of the wireless and the wired network for optimum throughput of data transmission. In yet another embodiment of the present disclosure, the communication network 110 is an optical fiber high bandwidth network that enables high data rate with negligible connection drops.

Further, the computing device 104 embeds the signal generator circuitry 106. The computing device 104 embeds the signal generator circuitry 106 to trigger signal for communicating information between the associated systems in real time. In an embodiment of the present disclosure, the signal generator circuitry 106 generates signal to trigger one or more hardware components associated with the computing device 104. The one or more hardware components are triggered for one or more purposes. The one or more purposes include but are not limited to logically partition the geographical region into one or more logical zones, determine the zone of the one or more logical zones, to perform specific operation and the like. The one or more purposes include generating signal based on requirement of the address classification and sorting system 112.

Further, the interactive computing environment 100 includes the address classification and sorting system 112. The computing device 104 connects with the address classification and sorting system 112 through the communication network 110. The computing device 104 connects with the address classification and sorting system 112 by utilizing one or more applications. The one or more applications include but may not be limited to a web browser, a mobile application, a widget, an API and web applets. In general, each application of the one or more applications provides one or more interfaces to the computing device 104. The one or more interfaces include but may not be limited to graphical user interface, voice controlled interface and actuated motor based interface. In addition, the web browser installed on the computing device 104 is any web browser. In an example, the web browser includes Google Chrome, Mozilla Firefox, Opera, UC Web, Safari, Internet Explorer, Microsoft Edge and the like. Further, the web browser installed on the computing device 104 runs on any version of the respective web browser of the above mentioned web browsers. In addition, the mobile application installed inside the computing device 104 may be based on any mobile platform. In an example, the mobile platform includes but may not be limited to Android, iOS, BlackBerry, Symbian, Windows and Bada. Further, the mobile application installed inside the computing device 104 runs on any version of respective mobile platform of the above mentioned mobile platforms.

The address classification and sorting system 112 logically partitions the geographical region or business region (hereinafter "geographical region") into the one or more logical zones in real-time. In an embodiment of the present disclosure, the geographical region refers to a physical region that includes one or more facilities in that region. In another embodiment of the present disclosure, the geographical region refers to the region that supports habitation of human beings. In an example, the geographical region includes an area, colony, sector, village, tehsil, city, state, town, country, continent, union territory or combination thereof. The one or more logical zones are simply the one or more sub-regions of the geographical region. The address classification and sorting system 112 logically partitions the geographical region into the one or more virtual zones. In an example, Chandigarh has two existing physical zones namely Zone four and Zone five. The address classification and sorting system 112 logically partitions the Zone four and Zone five into a plurality of logical zones (as mentioned above). The logical partitioning of the geographical region is not dependent on existing physically pre-defined zones of the geographical region.

The logically partitioned one or more logical zones are virtual zones that are created in real-time and are dynamic and adaptive in nature. In an embodiment of the present disclosure, the one or more logical zones dynamically adapts to any geometrical shape and size. In an embodiment of the present disclosure, each zone of the one or more logical zones is circular in shape. In another embodiment of the present disclosure, each zone of the one or more logical zones is rectangular in shape. In yet another embodiment of the present disclosure, each zone of the one or more logical zones is triangular in shape. In yet another embodiment of the present disclosure, each zone of the one or more logical zones is of any possible geometrical shape. In an embodiment of the present disclosure, each zone of the one or more logical zones is of different geometrical shape and size.

The address classification and sorting system 112 logically partitions the geographical region to train the address classification and sorting system 112. The address classification and sorting system 112 is trained with all available addresses of the one or more facilities. In addition, the address classification and sorting system 112 is continuously trained with the address data of newer addresses. The address classification and sorting system 112 is provided with one or more pre-defined points of interests. In general, points of interests are specific point locations that someone may find useful or interesting. In an example, the points of interests are identified from the unstructured address information to figure out location of the facility. In another example, the points of interests are famous landmarks that help in finding out accurate location of the facility. The address classification and sorting system 112 logically partitions the geographical region based on the one or more pre-defined points of interests. The address classification and sorting system 112 segments the one or more pre-defined points of interests into one or more pre-defined localities and sub-localities. The one or more pre-defined localities and sub-localities help to determine the logical zone under which the address of the facility should fall. The logical zone is determined such that movement of the entities from the processing center 108 to the delivery address takes the shortest route and the least amount of time possible. The one or more pre-defined points of interests are segmented into the one or more pre-defined localities. Further, the one or more pre-defined localities are segmented into one or more pre-defined sub-localities. In an embodiment of the present disclosure, the address classification and sorting system 112 is trained to identify accurate location of the delivery address based on the one or more pre-defined points of interests. In an embodiment of the present disclosure, the address classification and sorting system 112 is trained to logically partition the geographical region into the one or more logical zones based on the delivery address of the one or more entities.

The address classification and sorting system 112 logically partitions the geographical region into the one or more logical zones based on one or more parameters. In addition, the one or more logical zones dynamically adapt to the one or more possible geometrical shapes and sizes based on the one or more parameters. The one or more parameters include population density, number of entities, number of addresses, revenue interest from the entities, nearby connectivity and the like. In an example, the geographical region with very large popular density is partitioned into logical zone by the address classification and sorting system 112. In another example, the geographical region that receives a very large number of entities in a day is partitioned into logical zone by the address classification and sorting system 112. In yet another example, the geographical region that shows collection of highest value of revenue due to processing, handling or delivery of entities is partitioned into logical zone by the address classification and sorting system 112. In yet another example, the geographical region with easier nearby connectivity is partitioned into logical zone by the address classification and sorting system 112. In yet another example, the one or more logical zones are created in such a way that they entirely cover up sub-region of the geographical region. In an embodiment of the present disclosure, the address classification and sorting system 112 utilizes the combination of the one or more parameters to logically partition the geographical region into the one or more logical zones.

The one or more entities are stored at the processing center 108. The address classification and sorting system 112 fetches an address data from an entity of the one or more entities containing the destination address on the entity of the one or more entities. The address data includes one or more unstructured address information associated with the one or more facilities. In an embodiment of the present disclosure, the address data is destination address present on the entity. In an embodiment of the present disclosure, form of the address data is at least one of human or machine readable form. The human or machine readable forms include but not limited to text, audio, video, image, gif, animation, electronic form, and hand-written form. The address data is fetched from the one or more entities using the one or more input devices. The one or more input devices include at least one of keyboard, scanner, pointing device, optical character reader, bar code reader, camera, microphone, tablet, and the like. In an example, the address data is in the form of text and fetched from the one or more entities using camera. In another example, the address data is provided in the form of audio using microphone by the user 102. In an embodiment of the present disclosure, the address data is fetched from the entities of the one or more entities using hardware-run text-processing algorithms. The hardware-run text processing algorithms include optical character recognition algorithms, natural language processing algorithms and the like. However, the hardware-run text processing algorithms are not limited to above mentioned algorithms. In an example, the hardware-run text processing algorithms helps in fetching textual data from the delivery address present on the entity.

Further, the address classification and sorting system 112 extracts one or more points of interests from the fetched address data. The extraction is done based on hardware-run machine learning algorithms. In an embodiment of the present disclosure, the hardware-run machine learning algorithms include graph-based machine learning algorithms, prediction algorithms, phonetic distance based fuzzy search algorithms and the like. However, the hardware-run machine learning algorithms are not limited to the above mentioned algorithms. The address classification and sorting system 112 extracts the one or more points of interests from the address data. The one or more points of interests are extracted from the address data based on one or more steps. The one or more steps include address cleaning, spell-check, spell-suggest, address tagging, micro-sorting, and the like. The address classification and sorting system 112 cleans non-essential characters from the address data during address cleaning. In an embodiment of the present disclosure, the non-essential characters refer to special characters that are not required in exact address of the facility. In an example, the non-essential characters refer to unnecessary punctuation marks, apostrophe, at sign and the like. Also, the address classification and sorting system 112 inserts space in between characters in the address data if space is missing from characters in the address data. The address classification and sorting system 112 flags misspelled words in the address data during spell-check step. In an example, Portland misspelled as Prtlnd is identified during the spell-check step. In another example, Chicago misspelled as Shicago is identified during the spell-check step.

The address classification and sorting system 112 suggests correct words in replacement of misspelled or incorrect words during spell-suggest step. In an embodiment of the present disclosure, the address classification and sorting system 112 suggests the correct words on the computing device 104. Further, the user 102 selects the correct word to replace with the incorrect word. Furthermore, the address classification and sorting system 112 affixes one or more tags to the one or more entities of addresses thereof during the address tagging step. In an example, the one or more tags include order tags, call tags and the like. The address classification and sorting system 112 extracts the one or more points of interests to determine the zone of the one or more logical zones associated with the entity of the one or more entities.

The interactive computing environment 100 includes the signal generator circuitry 106 embedded inside the computing device 104. The computing device 104 hosts the address classification and sorting system 112. The address classification and sorting system 112 generates a signal to determine the particular zone of the one or more logical zones associated with the entity of the one or more entities. The address classification and sorting system 112 extracts the one or more points of interests from the address data. The one or more points of interests are segmented into one or more localities. Further, the one or more localities are segmented into one or more sub-localities. The one or more points of interests are segmented into the one or more localities and sub-localities to determine exact location of the delivery address of the one or more entities. In an example, the address data is fetched from the entity of the one or more entities. The one or more points of interests are fetched from the address data. The one or more points of interests are segmented into the one or more localities. The one or more localities are segmented into the one or more sub-localities. Further, the address classification and sorting system 112 determines the logical zone that constitutes the accurate location of the delivery address of the entity of the one or more entities.

The address classification and sorting system 112 determines the zone of the one or more logical zones based on a confidence level. Each zone of the one or more logical zones is assigned the confidence level before determination of the zone. The address classification and sorting system 112 analyzes the confidence level of each zone of the one or more logical zones. The confidence level is indication of level of confidence that the address classification and sorting system 112 shows in each zone of the one or more logical zones. In an embodiment of the present disclosure, the address classification and sorting system 112 determines the particular zone of the one or more logical zones when the confidence level of that zone is greater than a threshold value. In another embodiment of the present disclosure, the address classification and sorting system 112 determines that particular zone of the one or more logical zones which has the highest confidence level of the one or more logical zones. Further, the confidence level of each zone of the one or more logical zones is calculated in real-time. Furthermore, the confidence level of each zone of the one or more logical zones is updated in dynamic and adaptive nature. The confidence level of each zone of the one or more logical zones is calculated based on the one or more parameters. (as mentioned above) In an embodiment of the present disclosure, the confidence level enables prediction of unforeseen address data with higher level of accuracy. The unforeseen address data refers to the address information that is not previously available to the address classification and sorting system 112.

In an embodiment of the present disclosure, the address classification and sorting system 112 determines the zone of the one or more logical zones based on mapping of the one or more pre-defined points of interests with the extracted one or more points of interests. The extracted one or more points of interests are mapped with the one or more pre-defined points of interests. Further, the extracted one or more localities are mapped with the one or more pre-defined localities. Furthermore, the extracted one or more sub-localities are mapped with the one or more pre-defined sub-localities. The address classification and sorting system 112 determines the zone in which the exact location of the delivery address of the entity is going to fall.

Further, the address classification and sorting system 112 logically updates the one or more logical zones based on the extracted one or more points of interests in real-time. The address classification and sorting system 112 updates the one or more logical zones for the newly fetched address data. The address classification and sorting system 112 updates the one or more logical zones in dynamic and adaptive nature. The address classification and sorting system 112 updates the one or more logical zones based on the one or more parameters. (as mentioned above) The address classification and sorting system 112 updates the one or more logical zones to speed up processing and reduce dependency on resources during the sorting process of the one or more entities. In an embodiment of the present disclosure, the geometrical shape of the one or more logical zones may change after updating the one or more logical zones. In another embodiment of the present disclosure, the geometrical shape of the one or more logical zones may not change after updating the one or more logical zones.

Further, the interactive computing environment 100 includes the server 114. The address classification and sorting system 112 is connected with the server 114. In general, the server 114 is a computer program that provides service to another computer programs. In general, the server 114 may provide various functionalities or services, such as sharing data or resources among multiple clients, performing computation for a client and the like. In an example, the server 114 may be at least one of dedicated server, cloud server, virtual private server and the like. However, the server 114 is not limited to above mentioned servers.

Further, the server 114 includes the database 116. In general, the database 116 is a collection of information that is organized so that it can be easily accessed, managed and updated. In an example, the database 116 may be one of at least hierarchical database, network database, relational database, object-oriented database and the like. The database 116 provides storage location to the one or more pre-defined points of interests, the one or more pre-defined localities, the one or more pre-defined sub-localities, the address data, the one or more points of interests, the one or more localities, the one or more sub-localities, and the like. In an embodiment of the present disclosure, the database 116 provides storage location to all the data and information required by the address classification and sorting system 112. In an example, the database 116 is connected to the server 114. The server 114 stores data in the database 116. The server 114 interacts with the database 116 to retrieve the stored data.

In an embodiment of the present disclosure, the information about the one or more pre-defined points of interests may be collected from one or more third party databases in real time. In another embodiment of the present disclosure, the user 102 provides the one or more pre-defined points of interests to the address classification and sorting system 112. In an embodiment of the present disclosure, the address data may or may not contain ambiguous data. The term ambiguous data refers to data that is not required to be in the delivery address of the facility. In addition, ambiguous data is only used to provide a better understanding about the address of the facility. The address data is associated with the one or more facilities. The address classification and sorting system 112 fetches the address data in real-time.

In an embodiment of the present disclosure, the address classification and sorting system 112 utilizes geocode co-ordinates of the delivery addresses of the one or more entities to sort the one or more entities into the one or more compartments. In another embodiment of the present disclosure, the address classification and sorting system 112 sort the one or more entities into the one or more compartments without using geocode co-ordinates of the delivery addresses of the one or more entities.

In an embodiment of the present disclosure, the address classification and sorting system 112 removes incorrect spellings in the address data during address-cleaning step. The address classification and sorting system 112 removes incorrect spellings based on past learning and training by the address classification and sorting system 112 for similar geography or nature of addresses. In an embodiment of the present disclosure, the address classification and sorting system 112 enhances the extracted one or more points of interests, localities and sub-localities with enriched and enhanced additional information and details. The address classification and sorting system 112 does enrichment and enhancement based on past learning and training by the address classification and sorting system 112 for similar geography or nature of addresses.

In an embodiment of the present disclosure, the address data may be received in any language. The address classification and sorting system 112 has the capability to extract the one or more points of interests from the address data presented in any language. In an example, the address data is presented in English language. In another example, the address data is presented in Hindi language. In yet another language, the address data is presented in any other possible language such as Marathi, Tamil, French, Spanish and the like.

In an embodiment of the present disclosure, the address classification and sorting system 112 fetches the address data using optical character recognition algorithms. In general, optical character recognition is recognition of printed or written text characters by a computer. In general, optical character recognition involves photo scanning of text character-by-character, analysis of scanned-in image, and translation of character image into character codes, such as ASCII, commonly used in data processing. In another embodiment of the present disclosure, the address classification and sorting system 112 fetches the address data using natural language processing algorithms.

In an example, if the address data is:
71 Green Lake Drive
Brooklyn, N.Y. 11228

The one or more processors 102 are going to extract the one or more points of interests as 'Green Lake Drive' and 'Brooklyn'. The one or more processors 102 are going to segment the one or more localities as 'Brooklyn'. The one or more processors 102 are going to segment the one or more sub-localities as 'Green Lake Drive'. Further, the above extracted one or more pre-defined points of interests, localities and sub-localities are mapped with the pre-defined one or more points of interests, localities and sub-localities. Furthermore, the zone is determined that constitutes the above mentioned address of the facility.

In an embodiment of the present disclosure, the address classification and sorting system 112 maps the address data to pre-defined data stored in the database 116 of the address classification and sorting system 112. The address classification and sorting system 112 map the address data at lowest level to accurately determine the zone that constitutes the accurate location of the delivery address of the entity. In an example, the address classification and sorting system 112 maps the address data at locality level. The address classification and sorting system 112 map the one or more extracted localities with the one or more pre-defined localities for improving accuracy in the determination of the zone.

In an embodiment of the present disclosure, the determination of the zone by the address classification and sorting system 112 eliminates a plurality of errors such as misrouting of the entities, mishandling of the entities, mis-assignment of the entities, and the like. The address classification and sorting system 112 increases productivity and accuracy in last-mile facility determination. In general, last mile is a term used in supply chain management and transportation planning to describe movement of entities or people or goods from a transportation hub to final destination. In an embodiment of the present disclosure, the address classification and sorting system 112 determines the zone associated with the entity in a single scan in a very less amount of time. In an embodiment of the present disclosure, the address classification and sorting system 112 provides accurate and fast sorting of the one or more entities or addresses thereof to be delivered in the one or more logical zones.

In an embodiment of the present disclosure, the address classification and sorting system 112 differentiates the address data to recognize address as commercial address, residential address, defense address and the like. In an example, the address classification and sorting system 112 sorts the entity and assigns delivery time of working hours to the entity falling under category of commercial address. In another example, the address classification and sorting system 112 sorts the entity and assigns delivery time of full working day to the entity falling under category of residential address. In yet another example, the address classification and sorting system 112 sorts the entity and assigns special person for processing or handling or delivery of the entity falling under category of defense address.

The address classification and sorting system 112 may be implemented using the single computing device 104, or a network of computing devices, including cloud-based computer implementations. The computing device 104 is preferably server class computers including one or more high-performance computer processors and random access memory, and running an operating system such as LINUX or variants thereof. The operations of the address classification and sorting system 112 as described herein can be controlled through either hardware or through computer programs installed in non-transitory computer readable storage devices such as solid state drives or magnetic storage devices and executed by the processors to perform the functions described herein. The database 116 is implemented using non-transitory computer readable storage devices, and suitable database management systems for data access and retrieval. The address classification and sorting system 112 includes other hardware elements necessary for the operations described herein, including network interfaces and protocols, input devices for data entry, and output devices for display, printing, or other presentations of data. Additionally, the operations listed here are necessarily performed at such a frequency and over such a large set of data that they must be performed by a computer in order to be performed in a commercially useful amount of time, and thus cannot be performed in any useful embodiment by mental steps in the human mind.

It is shown in FIG. 1 that the user 102 uses the computing device 104 to connect to the address classification and sorting system 112; however, those skilled in the art would appreciate that there may be more number of users connecting to the address classification and sorting system 112. In addition, it is shown in FIG. 1 that the computing device 104 is used by the user 102 to connect to the address classification and sorting system 112; however, those skilled in the art would appreciate that there may be more number of computing devices used by the user 102 to connect to the address classification and sorting system 112. Also, it is shown in FIG. 1 that the entity and the user is present in the facility 108; however, those skilled in the art would appreciate that there may be more number of entities and users present in more number of facilities.

FIG. 2 illustrates an example of logically partitioning the geographical region 200 into the one or more logical zones in real-time, in accordance with various embodiments of the present disclosure. The geographical region 200 is logically partitioned into a first zone 202, a second zone 204, a third zone 206 and a fourth zone 208. The first zone 202 is circular in shape and may dynamically update and change its geometrical shape and size in real-time. The second zone 204 is triangular in shape and may dynamically update and change its geometrical shape and size in real-time. The third zone 206 is L-shaped polygon and may dynamically update and change its geometrical shape and size in real-time. The fourth zone 208 is plus-shaped polygon and may dynamically update and change its geometrical shape and size in real-time.

FIG. 3 is a flowchart 300 of a method for classification and sorting of the one or more addresses to increase productivity of the classification and the sorting process of the one or more addresses, in accordance with various embodiments of the present disclosure. It may be noted that to explain the process steps of the flowchart 300, references will be made to the system elements of FIG. 1. The flowchart 300 initiates at step 302. Following step 302, at step 304, the address classification and sorting system 112 logically partitions the geographical region into the one or more logical zones in real-time. The one or more logical zones are one or more sub-regions of the geographical region. The logical partitioning of the geographical region is done based on one or more pre-defined points of interests. The logical partitioning of the geographical region is done based on one or more parameters. The one or more parameters include population density, number of addresses, business interests from the addresses and nearby connectivity. At step 306, the address classification and sorting system 112 fetches the address data from the entity of the one or more entities containing the destination address. The address data is fetched from the entity of the one or more entities using one or more input devices. The address data is fetched from the entity of the one or more entities using hardware-run text-processing algorithms in real-time. At step 308, the address classification and sorting system 112 extracts the one or more points of interests from the fetched address data based on the hardware-run machine learning algorithms. The one or more points of interests are extracted from the address data based on one or more steps. The extraction is done to determine the particular zone of the one or more logical zones associated with the address of the one or more entities. At step 310, the address classification and sorting system 112 generates the signal by the signal generator circuitry 106 embedded inside the computing device 104 hosting the address classification and sorting system 112 for determining the zone of the one or more logical zones associated with the entity of the one or more entities. The determination is done based on the mapping of the one or more pre-defined points of interests with the extracted one or more points of interests. The determination is done to sort the entity of the one or more entities into the associated zone of the one or more logical zones. The zone of the one or more logical zones is determined based on the confidence level. The confidence level is calculated based on the one or more parameters in real-time. The confidence level enables the prediction of unforeseen address data with higher level of accuracy. At step 312, the address classification and sorting system 112 logically updates the one or more logical zones based on the extracted one or more points of interests in real-time. The updating is done for the newly fetched address data. The updating is done in dynamic and adaptive nature. The updating is done based on the one or more parameters. The updating is done to speed up processing and reducing dependency on resources during the sorting process of the one or more entities. The flow chart 300 terminates at step 314.

It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a computing device 104, in accordance with various embodiments of the present disclosure. FIG. 4 illustrates internal structural overview of the computing device 104. The computing device 104 includes a bus 402 that directly or indirectly couples the following devices: memory 404, one or more processors 406, one or more presentation components 408, one or more input/output (I/O) ports 410, one or more input/output components 412 and an illustrative power supply 414. The bus 402 represents what may be one or more buses (such as an address bus, data bus, or combination thereof). Although the various blocks of FIG. 4 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 4 is merely illustrative of an exemplary device 104 that can be used in connection with one or more embodiments of the present invention. Distinction is not made between such categories as "workstation," "server," "laptop," "hand-held device," etc., as all are contemplated within the scope of FIG. 4 and reference to "computing device."

The computing device 104 typically includes a variety of computer-readable media. The computer-readable media can be any available media that can be accessed by the computing device 104 and includes both volatile and non-volatile media, removable and non-removable media. By way of example, and not limitation, the computer-readable media may include computer storage media and communication media. The computer storage media includes volatile and nonvolatile, removable and non-removable media implemented in any method or technology for storage of information such as computer-readable instructions, data structures, program modules or other data. The computer storage media includes, but is not limited to, non-transitory computer-readable storage medium that stores program code and/or data for short periods of time such as register memory, processor cache and random access memory (RAM), or any other medium which can be used to store the desired information and which can be accessed by the computing device 104. The computer storage media includes, but is not limited to, non-transitory computer readable storage medium that stores program code and/or data for longer periods of time, such as secondary or persistent long term storage, like read only memory (ROM), EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 104. The communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 404 includes computer-storage media in the form of volatile and/or nonvolatile memory. The memory 404 may be removable, non-removable, or a combination thereof. Exemplary hardware devices include solid-state memory, hard drives, optical-disc drives, etc. The computing device 104 includes the one or more processors 406 that read data from various entities such as memory 404 or I/O components 412. The one or more presentation components 408 present data indications to a user or other device. Exemplary presentation components include a display device, speaker, printing component, vibrating component, etc. The one or more I/O ports 410 allow the computing device 104 to be logically coupled to other devices including the one or more I/O components 412, some of which may be built in. Illustrative components include a microphone, joystick, game pad, satellite dish, scanner, printer, wireless device, etc.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for increasing productivity of classification and sorting one or more addresses, the computer-implemented method comprising:

logically partitioning, at an address classification and sorting system executed by a processor, a geographical region into one or more logical zones in real-time, wherein the one or more logical zones are one or more sub-regions of the geographical region, wherein the logical partitioning of the geographical region is done based on one or more pre-defined points of interests, and based on one or more parameters, comprising: population density, a number of one or more addresses, business interests from the one or more addresses and nearby connectivity to the one or more addresses, wherein the one or more logical zones dynamically adapts to one or more geometrical shapes and sizes based on the one or more parameters;

single scanning an image to recognize, by optical character recognition, character-by-character text of address data in a short amount of time;

analyzing the scanned image, by training the address classification and sorting system on previously extracted and segmented unstructured address data using hardware-run machine learning algorithms;

translating the scanned image into character codes;

real-time fetching, using hardware-run text-processing algorithms at the address classification and sorting system, the address data from an entity of one or more entities containing a destination address, wherein the address data is fetched from the entity of the one or more entities using one or more input devices;

extracting, at the address classification and sorting system, one or more points of interests from the fetched address data based on hardware-run machine learning algorithms, wherein the one or more points of interests are extracted from the address data based on one or more languages, wherein the extraction is done to determine a zone of the one or more logical zones associated with the one or more entities, wherein the one or more points of interests are segmented into one or more localities and sub-localities, wherein the segmentation is done according to:

address cleaning of non-essential special characters and punctuation marks from the address data, spell-checking misspelled words in the address data, spell-suggesting correct words for replacing the misspelled words based on past learning and training by the address classification and sorting system for similar geography and similar addresses according to one or more languages, address tagging, and micro-classification;

generating, at the address classification and sorting system, a signal by a signal generator circuitry embedded inside a computing device hosting the address classification and sorting system, wherein the signal is generated for determining the zone of the one or more logical zones associated with the entity of the one or more entities, wherein the determination is done based on mapping of the one or more pre-defined points of interests with the extracted one or more points of interests, to sort the entity of the one or more entities into the zone of the one or more logical zones, wherein the zone of the one or more logical zones is determined based on a confidence level is calculated based on the one or more parameters in real-time, to predict unforeseen address data with a higher level of accuracy, wherein the confidence level is updated for each zone of the one or more logical zones in real-time, wherein the updating of the confidence level is dynamic and adaptive;

logically updating, at the address classification and sorting system with the processor, the one or more logical zones based on the extracted one or more points of interests in real-time, wherein the updating is done for newly fetched address data, based on the one or more parameters to speed up processing and reducing dependency on resources during sorting of the one or more entities;

changing one or more geometrical shapes after the updating of each zone of the one or more logical zones;

sorting, by the address classification and sorting system, the one or more entities into the one or more compartments using geocode co-ordinates of delivery addresses for the one or more entities; and wherein the geographical region is a physical area that comprises the one or more facility, and is logically partitioned into the one or more logical zones by the address classification and sorting system, wherein the one or more logical zones are virtual zones dynamically and adaptively created and updated in real-time.

2. The computer-implemented method as recited in claim 1, wherein the hardware-run text processing algorithms comprising optical character recognition algorithms and natural language processing algorithms, wherein the hardware-run machine learning algorithms comprising graph-based machine learning algorithms, prediction algorithms and phonetic distance based fuzzy search algorithms.

3. A computer system comprising:

one or more processors;

a signal generator circuitry embedded inside a computing device for generating a signal; and a memory coupled to the one or more processors, the memory storing instructions which, when executed by the one or more processors, cause the one or more processors to perform a computer-implemented method for increasing productivity of classification and sorting one or more addresses, the computer-implemented method comprising:

logically partitioning, at an address classification and sorting system, a geographical region into one or more logical zones in real-time, wherein the one or more logical zones are one or more sub-regions of the geographical region, wherein the logical partitioning of the geographical region is done based on one or more pre-defined points of interests, and based on one or more parameters, comprising: population density, a number of one or more addresses, business interests from the one or more addresses and nearby connectivity to the one or more addresses, wherein the one or more logical zones dynamically adapts to one or more geometrical shapes and sizes based on the one or more parameters;
single scanning an image to recognize, by optical character recognition, character-by-character text of address data in a short amount of time;
analyzing the scanned image, by training the address classification and sorting system on previously extracted and segmented unstructured address data using hardware-run machine learning algorithms;
translating the scanned image into character codes;
real-time fetching, using hardware-run text-processing algorithms at the address classification and sorting system, the address data from an entity of one or more entities containing a destination address, wherein the address data is fetched from the entity of the one or more entities using one or more input devices;
extracting, at the address classification and sorting system, one or more points of interests from the fetched address data based on hardware-run machine learning algorithms, wherein the one or more points of interests are extracted from the address data based on one or more languages, wherein the extraction is done to determine a zone of the one or more logical zones associated with the one or more entities, wherein the one or more points of interests are segmented into one or more localities and sub-localities, wherein the segmentation is done according to:
  address cleaning of non-essential special characters and punctuation marks from the address data,
  spell-checking misspelled words in the address data,
  spell-suggesting correct words for replacing the misspelled words based on past learning and training by the address classification and sorting system for similar geography and similar addresses according to one or more languages,
  address tagging, and
  micro-classification;
generating, at the address classification and sorting system, a signal by a signal generator circuitry embedded inside a computing device hosting the address classification and sorting system, wherein the signal is generated for determining the zone of the one or more logical zones associated with the entity of the one or more entities, wherein the determination is done based on mapping of the one or more pre-defined points of interests with the extracted one or more points of interests, to sort the entity of the one or more entities into the zone of the one or more logical zones, wherein the zone of the one or more logical zones is determined based on a confidence level calculated based on the one or more parameters in real-time, to predict unforeseen address data with a higher level of accuracy, wherein the confidence level is updated for each zone of the one or more logical zones in real-time, wherein the updating of the confidence level is dynamic and adaptive;
logically updating, at the address classification and sorting system, the one or more logical zones based on the extracted one or more points of interests in real-time, wherein the updating is done for newly fetched address data, based on the one or more parameters to speed up processing and reducing dependency on resources during sorting of the one or more entities;
changing one or more geometrical shapes after the updating of each zone of the one or more logical zones;
sorting, by the address classification and sorting system, the one or more entities into the one or more compartments using geocode co-ordinates of delivery addresses for the one or more entities; and
wherein the geographical region is a physical area that comprises the one or more facility, and is logically partitioned into the one or more logical zones by the address classification and sorting system, wherein the one or more logical zones are virtual zones dynamically and adaptively created and updated in real-time.

4. A non-transitory computer-readable medium having instructions that, in response to execution of the instructions by one or more processors, cause the one or more processors to perform a method for increasing productivity of classification and sorting one or more addresses, the computer-implemented method comprising:
logically partitioning, at an address classification and sorting system, a geographical region into one or more logical zones in real-time, wherein the one or more logical zones are one or more sub-regions of the geographical region, wherein the logical partitioning of the geographical region is done based on one or more pre-defined points of interests, and based on one or more parameters, comprising: population density, a number of one or more addresses, business interests from the one or more addresses and nearby connectivity to the one or more addresses, wherein the one or more logical zones dynamically adapts to one or more geometrical shapes and sizes based on the one or more parameters;
single scanning an image to recognize, by optical character recognition, character-by-character text of address data in a short amount of time;
analyzing the scanned image, by training the address classification and sorting system on previously extracted and segmented unstructured address data using hardware-run machine learning algorithms;
translating the scanned image into character codes;
real-time fetching, using hardware-run text-processing algorithms at the address classification and sorting system, the address data from an entity of one or more entities containing a destination address, wherein the address data is fetched from the entity of the one or more entities using one or more input devices;
extracting, at the address classification and sorting system, one or more points of interests from the fetched address data based on hardware-run machine learning algorithms, wherein the one or more points of interests are extracted from the address data based on one or more languages, wherein the extraction is done to determine a zone of the one or more logical zones associated with the one or more entities, wherein the one or more points of interests are segmented into one or more localities and sub-localities, wherein the segmentation is done according to:
  address cleaning of non-essential special characters and punctuation marks from the address data,
  spell-checking misspelled words in the address data,
  spell-suggesting correct words for replacing the misspelled words based on past learning and training by the address classification and sorting system for similar geography and similar addresses according to one or more languages,
address tagging, and
micro-classification;
generating, at the address classification and sorting system, a signal by a signal generator circuitry embedded inside a computing device hosting the address classification and sorting system, wherein the signal is generated for determining the zone of the one or more logical zones associated with the entity of the one or more entities, wherein the determination is done based on mapping of the one or more pre-defined points of interests with the extracted one or more points of interests, to sort the entity of the one or more entities into the zone of the one or more logical zones, wherein the zone of the one or more logical zones is determined based on a confidence level calculated based on the one or more parameters in real-time, to predict unforeseen address data with a higher level of accuracy, wherein the confidence level is updated for each zone of the one or more logical zones in real-time, wherein the updating of the confidence level is dynamic and adaptive;

logically updating, at the address classification and sorting system, the one or more logical zones based on the extracted one or more points of interests in real-time, wherein the updating is done for newly fetched address data, based on the one or more parameters to speed up processing and reducing dependency on resources during sorting of the one or more entities;

changing one or more geometrical shapes after the updating of each zone of the one or more logical zones;

sorting, by the address classification and sorting system, the one or more entities into the one or more compartments using geocode co-ordinates of delivery addresses for the one or more entities; and wherein the geographical region is a physical area that comprises the one or more facility, and is logically partitioned into the one or more logical zones by the address classification and sorting system, wherein the one or more logical zones are virtual zones dynamically and adaptively created and updated in real-time.

* * * * *